United States Patent
Gates

[15] 3,682,252
[45] Aug. 8, 1972

[54] HARROW ATTACHMENT AND MUD CLEANER FOR GRAIN DRILLS

[72] Inventor: Robert B. Gates, Loraine, N. Dak. 58753

[22] Filed: June 1, 1970

[21] Appl. No.: 41,804

[52] U.S. Cl. ............... 172/198, 172/438, 172/564, 172/610, 111/66
[51] Int. Cl. ............................................. A01b 49/04
[58] Field of Search............172/195, 197, 198, 564; 111/59, 60, 66

[56] References Cited

UNITED STATES PATENTS

| | | | |
|---|---|---|---|
| 2,994,388 | 8/1961 | Ryan | 172/198 |
| 2,736,252 | 2/1956 | Latshaw | 172/198 |
| 3,500,936 | 3/1970 | Vigen | 172/198 |
| 3,532,171 | 10/1970 | Kasten | 172/197 |
| 550,661 | 12/1895 | Swift | 172/564 |
| 906,692 | 12/1908 | Cole | 172/564 |

FOREIGN PATENTS OR APPLICATIONS 527,684  4/1954  Belgium.....................111/59

Primary Examiner—Robert E. Pulfrey
Assistant Examiner—C. W. Hanor
Attorney—Robert E. Kleve

[57] ABSTRACT

The invention comprises a harrow attachment for grain drills, having a pole extending horizontally across the rearward end of the grain drill and attached thereto. A pair of arm are pivotally mounted to the pole and a dual pair of levers are pivotally mounted to the arms with harrow teeth mounted to the lower end of the lever arms. The arms may be pivoted upwardly about the axis of the pole against the back of the grain drill with gravity causing the levers to pivot downward with the harrow teeth attached thereto to pivot the harrow teeth compactly against the grain drill.

1 Claim, 5 Drawing Figures

PATENTED AUG 8 1972 3,682,252
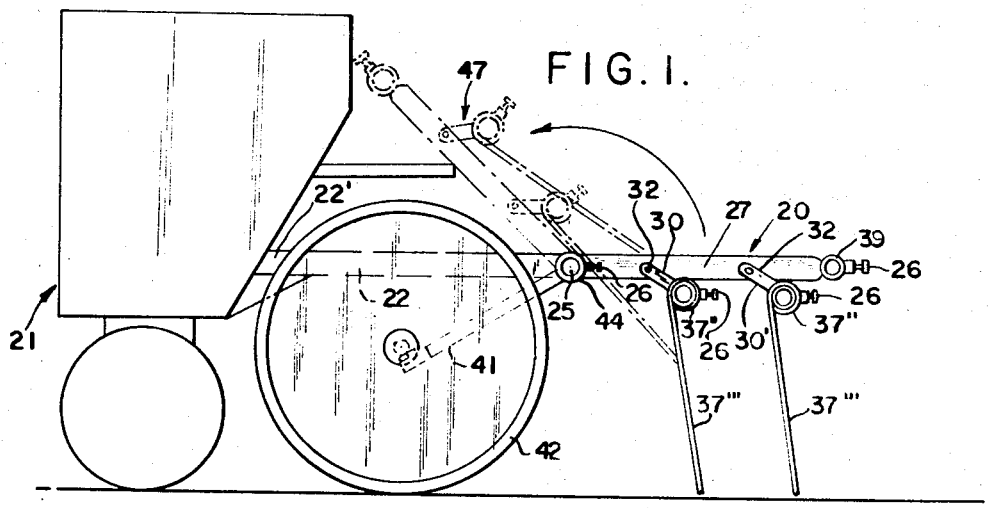
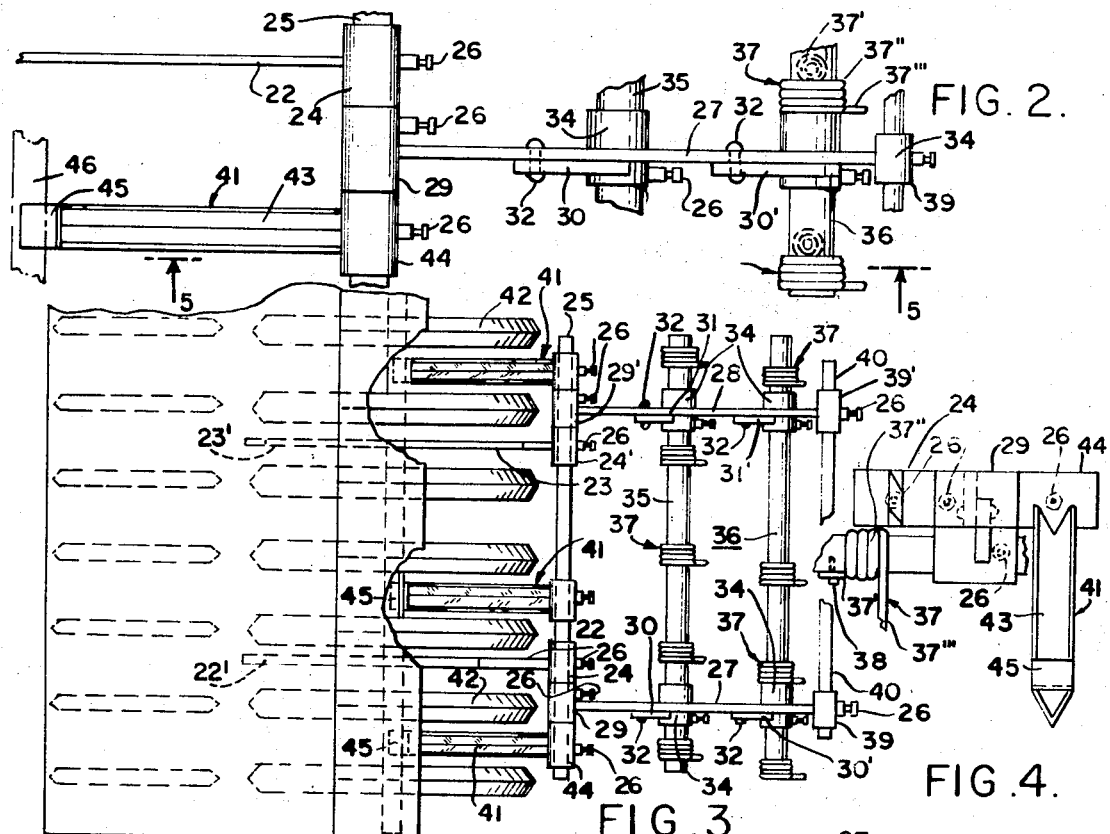
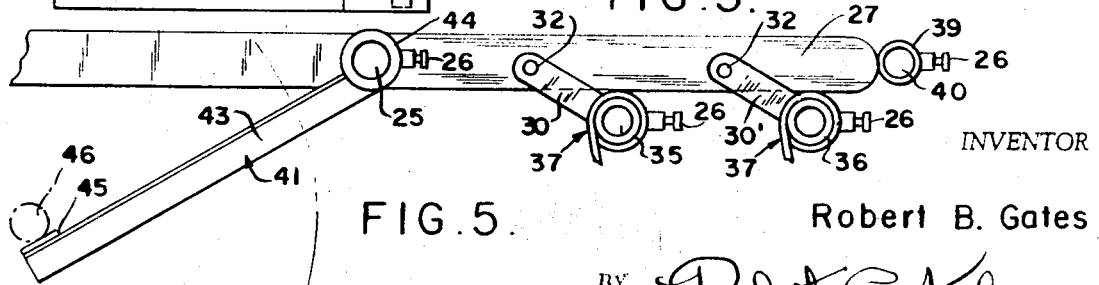
INVENTOR
Robert B. Gates
BY Robert E. Kleve
ATTORNEY

HARROW ATTACHMENT AND MUD CLEANER FOR GRAIN DRILLS

This invention relates to harrow attachments, more particularly the invention relates to harrow attachments for farm implements such as grain drills.

It is an object of the invention to provide a novel folding harrow for attaching to grain drills which will fold out of the way when not in use.

It is a further object of the invention to provide a novel folding harrow for attachment to grain drills which also has mud cleaners for cleaning between the leveling wheels of the grain drill.

It is another object of the invention to provide a novel harrow attachment which will fold into a compact storage position when not in use and which may easily fold out for operative use.

Further objects and advantages of the invention will become apparent as the description proceeds and when taken in conjunction with the accompanying drawing wherein:

FIG. 1 is a side elevational view of the folding harrow and mud cleaner attachment for grain drills.

FIG. 2 is a top plan view of the harrow and cleaner attachment invention.

FIG. 3 is a fragmentary enlarged top plan view of the harrow and cleaner attachment invention.

FIG. 4 is an enlarged fragmentary side elevational view of the harrow and cleaner attachment invention.

FIG. 5 is a cross-sectional view taken along line 5—5 of FIG. 2.

Briefly stated, the invention comprises a folding harrow and cleaner attachment for grain drills having a pair of arms extending downwardly from the grain drill and attachment thereto, a sleeve fixed to the outer ends of each arm, a pole mounted in the sleeves, a second pair of sleeves mounted to the pole and a second pair of arms extending rearwardly and fixed to the sleeves, a pair of lever arms pivotally mounted to each of the second pair of arms, a pair of support poles mounted to the outer ends of the lever arms, and harrow teeth mounted to the support poles, said second pair of arms with the lever arms and support poles and harrow teeth being adapted to pivot upward and forward toward the grain drill for storage, with said lever arms and support poles and teeth pivoting also about the axis of the pivotal mounting of the lever arms to swing the support poles and teeth toward the second pair of arms for compact storage, a plurality of mud cleaners.

Referring more particularly to the drawing, in FIG. 1, the folding harrow and cleaner attachment 20 for grain drills is illustrated mounted behind a conventional grain drill 21.

The attachment 20 has a pair of attachment arms 22 and 23 with their forward ends 22' and 23' fixed to the rear of the box of the grain drill 21. A pair of sleeves or collars 24 and 24' are fixed to the rear end of the attachment arms 22 and 23.

A cylindrical pole 25 is slidably received in the sleeves 24, 24' and is adjustably locked to the sleeves 24, 24' by a set of screws 26, which set screws 26 are threaded into collars 24 and 24' and engage the pole 25 to lock the pole 25 to the sleeves 24 and 24'.

A pair of main frame arms 27 and 28 have a pair of sleeves 29 and 29', respectively, fixed to the forward ends of arms 27 and 28. The sleeves 29 and 29' also have set screws 26 threaded into the sleeves to adjustably lock the sleeves 29 and 29' to the pole and thereby adjustably lock the frame arms 27 and 28 to the pole 25.

A dual pair of levers 30 and 30' and 31 and 31' are pivotally mounted at their upper ends to the main frame arms 27 and 28, respectively, by bolts 32 and the levers 30 and 30' and 31 and 31' are free to pivot about the axis of the bolts 32.

Each lever 30 and 30' and 31 and 31' has a sleeve 34 fixed to the lower end. A pair of cylindrical poles 35 and 36 are slidably received in the sleeves 34 and set screws 26 are threaded into the sleeves 34 to engage the poles 35 and 36 and lock the poles relative to the sleeves.

A plurality of conventional harrow teeth 37 are attached to poles 35 and 36 in a conventional manner. Each harrow tooth 37 has its upper end 37' curved around a bolt 38 to secure the teeth to either pole 35 and 36, the bolts 38 being threaded into the poles 35 and 36. The intermediate portions 37" are wound around their particular pole, either pole 35 or 36, and their lower ends 37"'40 extend downward in a straight line toward the ground for penetration into the ground for working the ground behind the grain drill.

A pair of sleeves 39 and 39' are fixed to the outer ends of arms 27 and 28. A rod 40 is slidably received in the sleeves 39 and 39', and set screws 26 are threaded into sleeves 39 and 39' against rod 40 to lock the rod 40 to the sleeves 39 and 39'. The rod 40 serves as additional weight to hold the harrow attachment in its working position illustrated in solid lines in FIG. 1.

Three mud cleaners 41 are provided to clean the mud and rock that may lodge between the leveling wheels 42 of the grain drill 21.

The mud cleaners 41 have a V-shaped channel member 43 with a sleeve 44 fixed to the upper end of the channel members 43. The cleaners 41 are maintained in their position shown in FIG. 5 by a set screw 26 which is threaded into sleeves 44 against pole 25 to lock the cleaners 41 to the pole 25. A rectangular plate 45 is fixed across the top edge of the lower end of the channel member 43 and engages against the main center shaft 46 of the leveling wheels 42. When the leveling wheels 42 rotate counterclockwise, when viewed from FIG. 1, as the grain drill moves forward the shaft 46 rotates against the plate 45, which prevents wear upon the channel member 43.

OPERATION

The folding harrow invention 20 is operated as follows:

The main frame arms 27 and 28, the lever arms 30 and 30' and 31 and 31', the sleeves 34, poles 35 and 36, teeth 37, pole 40 are pivoted clockwise downward from the position shown in dashed lines and designated by numeral 47 to their position shown in solid lines and designated by numeral 48.

When the attachment is in its position shown in solid lines in FIG. 1, the harrow teeth 37 will penetrate the ground behind the grain drill 21, as the grain drill is moved forward, from right to left when viewed from FIG. 1, and the teeth will thereby harrow the ground behind the drill.

The arms 27 and 28 will be locked in their position shown in solid lines in FIG. 1, by tightening screws 26 in sleeves 29 and 29' against pole 25.

When it is desired to store the harrow attachment invention 20, the screws 26 in sleeves 29 and 29' will be loosened, and the frame arms 27 and 28, their levers and harrow teeth and rod 40 and associates sleeves will be pivoted counterclockwise upward against the platform 49 at the back of the grain drill and the screws 26 in sleeves 29 and 29' will be re-tightened to lock the attachment in this stored position. The pivoting of the frame member 27 upward to their stored position will cause the lever arm 30, 30', 31, and 31' to pivot clockwise about the bolts 32 to their position shown in dashed lines in FIG. 1, which also pivots the poles 35 and 36 and the harrow teeth about the bolts 32 to their position shown in dashed lines in FIG. 1, thereby placing the harrow teeth compactly against the back of the grain drill.

Thus, it will be seen that a novel harrow attachment has been provided for a grain drill which will fold compactly out of the way when not in use, and which attachment also provided mud cleaners for the leveling wheels of the grain drill.

It will be obvious that various changes and departures may be made to the invention without departing from the spirit thereof.

What is claimed is:

1. A harrow and mud cleaner for mounting behind a grain drill having a plurality of spaced rotatably leveling wheels rotatably mounted to a horizontal shaft, said harrow and mud cleaner comprising a pole adapted to be attached across the rearward end of the grain drill, a pair of arms pivotally mounted to the pole, a pair of levers for each arm with the upper ends of the levers pivotally mounted to the arms, sleeves fixed to the lower ends of the levers, a pair of harrow teeth support poles mounted in the sleeves, a plurality of harrow teeth mounted to the support poles, said arms being pivotally mounted to pivot upward and forward against the rear of the grain drill, with the upward movement of the arms causing the levers to pivot downward to place the harrow teeth out of the way when not in use, a plurality of V-shaped channel members forming mud cleaners, said V-shaped channel members extending forward and downward in length between the leveling wheels with their rearward ends attached to said pole and with their forward ends abutting the underside of the horizontal shaft, and with the apex of the V-shaped mud cleaners extending downward, whereby as the leveling wheels rotate relative to the mud cleaners, the mud cleaners will engage any mud lodged between the leveling wheels to remove the mud between the leveling wheels.

* * * * *